United States Patent [19]

Kanamitsu

[11] 3,879,260

[45] Apr. 22, 1975

[54] PROCESS FOR PRODUCTION OF RIBOSIDES OF NUCLEIC ACID BASE DERIVATIVES AND ANALOGUES THEREOF

[75] Inventor: Osamu Kanamitsu, Saitama, Japan

[73] Assignee: Asahi Kasei Kogyo Kabushiki Kaisha, Osaka, Japan

[22] Filed: Mar. 5, 1973

[21] Appl. No.: 338,383

[30] Foreign Application Priority Data
Mar. 8, 1972  Japan.............................. 47-23125
May 11, 1972  Japan.............................. 47-46614

[52] U.S. Cl............................................... 195/28 N
[51] Int. Cl........................................... C12d 13/06
[58] Field of Search................................... 195/28 N

[56] References Cited
UNITED STATES PATENTS

| | | | |
|---|---|---|---|
| 3,269,917 | 8/1966 | Imada et al. | 195/28 N |
| 3,468,759 | 9/1969 | Skoda et al. | 195/28 N |
| 3,535,207 | 10/1970 | Shiro et al. | 195/28 N |
| 3,764,472 | 10/1973 | Nakayama | 195/28 N |
| 3,806,413 | 4/1974 | Nakayama | 195/28 N |

FOREIGN PATENTS OR APPLICATIONS

7,035,235  11/1970  Japan.............................. 195/28 N

*Primary Examiner*—Alvin E. Tanenholtz
*Attorney, Agent, or Firm*—Flynn & Frishauf

[57] ABSTRACT

A process for the production of ribosides of purine or pyrimidine base derivatives or analogues such as, for example, 5-fluorouracil riboside, which is useful for an anti-cancer agent. The process is conducted by preculturing a microorganism belonging to Flavobacterium such as, for example, *Flavobacterium aquatile* IFO 3772 in a medium containing a suitable nutrient source and thereafter either continuing the culture of the microorganism after a purine or pyrimidine derivative or analogue is added to the original medium, or submerging the cells produced by the preculture in a buffered suspension containing the said purine or pyrimidine derivative or analogue.

6 Claims, No Drawings

PROCESS FOR PRODUCTION OF RIBOSIDES OF NUCLEIC ACID BASE DERIVATIVES AND ANALOGUES THEREOF

This invention relates to an improvement on the process for the production of ribosides of nucleic acid base derivatives and ribosides of analogues of the said derivatives. More particularly, the present invention concerns a process for the production of ribosides of nucleic acid base derivatives and analogues thereof by the use of microorganisms which belong to genus Flavobacterium and are capable of producing ribosides of compounds selected from the group consisting of nucleic acid base derivatives and analogues thereof.

Many nucleic acid base ribosides are expected to manifest antagonism to tumors, viruses and microorganisms and inhibit metabolism and are now utilized as medicines or biochemical reagents. Thus, the development of a process suitable for commercial operation because of inexpensiveness has long been awaited.

Some of the biological activities of nucleic acid base ribosides known to date are introduced below.

5-Fluorouracil is now used widely as an anti-tumor agent useful for the treatment of leukemia and other cancerous diseases in the human system. 5-Fluorouracil riboside is known to have a stronger anti-tumor ability (manifest the anti-tumor property at a lower concentration) than 5-fluorouracil. M. Umeda & C. Heidelberger (Cancer Research, 28, 2529–2538 (1968)) reported that the said riboside provided the same degree of inhibition of the in vitro growth of Hela cells, Novikoff hepatoma cells, Leukemia 5178 cells, etc, when it was used in a concentration about 1/100 that of 5-fluorouracil. K. Parenjothy & V. Raghavan (Plant Cell Physiol., 1970, 11 (2), 259 – 271) reported that the growth of embryos of Alaska peas (*Pisum sativum* var. Alaska) was suppressed more by 5-fluorouracil riboside than by 5-fluorouracil.

L. Slechta & J. H. Hunder (Ann. N.Y. Acad. Sci., 1970, 173 (Art. 1), 708–713) reported that 2-thiouracil riboside, when used in a concentration of 50 – 150 $\mu$g/ml, inhibited the in vitro propagation of Coxsackie A-21 virus in mammalian cells.

L. L. Leonaid, V. Ter Menler & J. M. Freemen (Proc. Soc. Exp. Biol. Med., 1971, 136 (3), 857–862) reported that 6-azauracil riboside proved to be an inhibitor of the synthesis of RNA and inhibited the in vitro replication of measles virus in mammalian cells.

Further, it has been reported that antibiotics such as Nebularine, Toyocamycin and Tubercidin which may be classified in chemical structure as nucleic acid base ribosides manifest antagonism to microorganisms, viruses or tumors.

As described above, many nucleic acid base ribosides possess conspicuous biological activities. In most cases, these nucleic acid base ribosides manifest much stronger activities than their corresponding free bases. When the free bases are used as medicines, they must be prepared in the form of salts with HCl, $H_2SO_4$ or other mineral acids or of organic acids before the bases are dissolved in an aqueous solution. This is because the bases themselves have low solubility in water. Difficulty is sometimes encountered to prepare as solutions suited for injection. Ribosides, however, have an advantage that they are generally more soluble in water than their corresponding free bases and, therefore, dissolve sufficiently in water in relatively high concentrations.

Heretofore, the following methods have been proposed for the production of nucleic acid base ribosides.

The ribose group is introduced into a given nucleic acid base by means of chemical reaction or by aid of a microorganism. One method effects this introduction by using a microorganism such as *Bacillus cereus* which belongs to genus Bacillus (Collection Czechoslov. Chem. Commun., Vol. 26, 1386–1392 (1961)). *Escherichia coli* is used to produce 6-azauridine from 6-azauracil in another method (Experientia, 13, 150–151 (1957)). In still another method (J. Biol. Chem., 235, 764–768 (1960)), *Streptococcus faecalis* is utilized. Enzymatic methods have also been proposed. In one of these methods (Agr. Biol. Chem., 29, 742–750 (1965)), N-transribosidation is performed by using ribonucleotide or ribonucleoside as a ribose-source. However, methods resorting to chemical reactions are not commercially advantageous in that the reactions are time-consuming, involve secondary reactions and require use of expensive raw materials. Microbial methods and enzymatic methods are not necessarily satisfactory economically in terms of yields and ranges of adoptability.

The present invention has found, among the microorganisms belonging to genus Flavobacterium, such strains that are capable of efficiently producing from nucleic acid bases their corresponding ribosides or ribosides corresponding to the products to which the said base compounds are converted by the metabolism of the microorganisms. They are wild strains such as *Flavobacterium aquatile* (IFO 3772) and *Flavobacterium suaveolens* (ATCC 958) and mutants derived therefrom, for example.

The present inventor has already proposed a process for producing inosine, inosine, xanthosine, guanosine and uridine respectively from adenine, hypoxanthine, xanthine, guanine and uracil by utilizing the microorganisms (Japanese Patent No. 608,158).

The present inventor has now discovered further that many nucleic acid base derivatives and analogues thereof other than the major type naturally occurring nucleic acid bases described above efficiently produce their corresponding ribosides and ribosides corresponding to the products of the metabolic conversion of said compounds by virtue of the aforementioned strains of genus Flavobacterium.

It is a primary object of this invention to provide a process for the production of nucleic acid base derivatives excluding those indicated above by the use of Flavobacterium.

It is another object of this invention to provide a process for producing ribosides of the analogues of analogues nucleic acid bases by the use of Flavobacterium.

This invention provides a simple and inexpensive process for producing from nucleic acid bases their corresponding ribosides and ribosides corresponding to the products of the metabolic conversion of said compounds by microorganisms in use. It further provides a method which permits the culture of microorganisms and the ribosidation of nucleic acid bases to be effected in one and the same culture medium in one stage of operation and which, therefore, proves to be advantageous in point of operational cost. It also provides a method which effects the growth of microorganisms and the ribosidation of bases separately in two stages of operation.

Starting materials

The nucleic acid bases which can be used as the starting materials for the present invention are those represented by the following generic formulas:

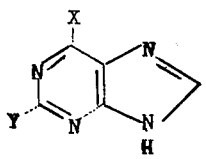

wherein X is H atom or OH group and Y is H atom, alkyl group, alkylthio group, Cl atom or OH group, exclusive of when both X and Y are OH and when X is OH and Y is H;

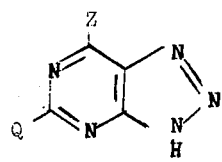

wherein Z is OH or $NH_2$ group and Q is H atom or OH group;

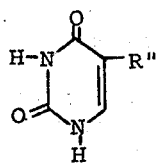 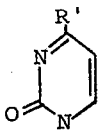

wherein R is H atom or SH group;

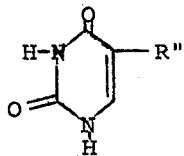

wherein R is OH group, F, Cl, Br or I atom or $NO_2$ group; or

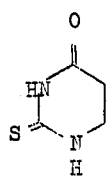

Examples of the nucleic acid bases are:
a. Purine type derivatives such as, for example, purine, 2-chlorohypoxanthine, 2-methylmercaptohypoxanthine and 2-hydroxypurine.

b. Pyrimidine type derivatives such as, for example, 2-hydroxypyrimidine, 5-hydroxyuracil, 5-fluorouracil, 5-chlorouracil, 5-bromouracil, 5-iodouracil, 5-nitrouracil, 2-thiouracil and 4-thiouracil.

Examples of the nucleic acid base analogues are:
c. Analogues of purine bases such as, for example, 8-aza-adenine, 8-azahypoxanthine and 8-azaxanthine.
d. Analogues of pyrimidine bases such as, for example, 6-azauracil.

These derivatives and analogues will hereinafter be referred to as "nucleic acid bases."

Microorganisms

In addition to *Flavobacterium aquatile* IFO 3772 described above, ATCC 11947 and 8375 belonging to the same species can also be used. Besides *Flavobacterium suaveolens* mentioned above, ATCC 13718 belonging to the same species can be used. Some mutants of the above microorganisms can also be used.

Production

The production of ribosides of nucleic acid bases is effected by either of the two methods: they are (A) a method comprising addition of the said nucleic acid bases to growth media of the microorganisms and (B) a method comprising preculturing the microorganisms and subsequently separating the precultured microorganisms and transferring them into solutions containing the nucleic acid bases.

Method of (A)

For the growth of the microorganism to be used in the present invention, there may be used a medium containing carbohydrates, nitrogen sources, inorganic salts, growth factors, etc. which are familiar to culturing Flavorbacterium. It is particularly desirable to effect the growth by using a medium which contains amino acids and vitamins. Examples of the carbohydrates which may be used are glucose, fructose, galactose, mannose, sucrose, maltose, lactose and glycerol. Nitrogen sources which may be used include amino acids and various natural substances serving as amino acid sources and their extracts besides ammonium salts of various inorganic and organic acids and ammonia. Essential inorganic salts are potassium phosphate and $Mg^{++}$ ion. Other metal ions including $Mn^{++}$, $Fe^{++}$ and $Zn^{++}$ ions may also be used. The potassium phosphate is generally used in a concentration of 0.1 – 1.0% and $Mg^{++}$ ion generally in a concentration of 0.01 – 1.0% (w/v %) as $MgSO_4.7H_2O$.

The growth of the microorganism is active when the medium has a neutral to weakly alkaline pH value. The culture is carried out generally at temperatures from 20° to 35°C, preferably in the neighborhood of 30°C. The culture is aerobically performed in the form of shaken culture or under aerated agitation.

The nucleic acid base may be added to the medium either in the early part or in the middle part of the whole culture period. Preferably, the addition may be made at such time that the cell concentration has been increased to some extent and the propagation of cells is still proceeding actively. Although the amount of nucleic acid base to be added is variable according to the base added, the microorganism employed or the conditions of culture, it generally falls in the range from 0.1 to 10 mg/ml. The addition may be made all at once or step by step in such a manner that abrupt increase of the concentration in the media is inhibited. The latter is preferable, because yield is better. Although the culture conditions are variable according to strain employed or the reaction conditions involved, it is desirable to control the culture so that the final pH value of the medium after the culture period of two to four days will be slightly acid (pH 3 – 6).

Method of (B)

The cells separated from the culture medium are added to a reaction solution which comprises the said nucleic acid base, carbohydrates such as glucose, $Mg^{++}$ ion and a buffer solution such as of phosphate. The separation of the cells may preferably be made at such time that their growth has reached the middle part of the logarithmic growth phase. Desirably the reaction temperature falls in the neighborhood of 30°C similarly to the culture temperature. This reaction is also carried out under aerobic conditions. Generally, this reaction produces the riboside of the said nucleic acid base in good yields in the reaction period of one to four days.

Recovery

Recovery of the produced riboside is carried out by following ordinary methods which are adopted for the recovery of nucleic acid-related substances from microorganic culture solutions. To be specific, the recovery is made by a treatment using active carbon or a treatment resorting to the use of ion-exchange resin.

The concentration of the riboside of nucleic acid base which is formed and accumulated in the medium is calculated from the value of absorption at the zone of the highest ultraviolet ray absorption which is obtained by having an ultraviolet absorption spot separated by means of paper chromatography or filter-paper electrophoresis and subsequently extracting the said spot with 0.1N hydrochloric acid.

There is produced a riboside which corresponds to the nucleic acid base used as the starting material or a riboside which corresponds to the product of the metabolic conversion of the base by the said microorganism. The standard (wild) strain of genus Flavobacterium generally disjoins the amino group at the 6-position of the purine type compound or the amino group at the 4-position of the pyrazolopyrimidine type compound in the beginning. In other words, the purine type compound gives birth to a 6-hydroxy substituted product and the pyrazolopyrimidine type compound to a 4-hydroxy substituted product. They are then subjected to ribosylation. They produce corresponding ribosides of 6-hydroxy and 4-hydroxy substituted products. Where 8-aza-adenine is used, for example, there is obtained, instead of 8aza-adenine riboside, the riboside of 8-azahypoxanthine which is the product of the metabolism of 8-aza-adenine by the microorganism being used. Particularly in case where 8-aza-adenine is used, what is obtained in not 8-aza-adenine riboside but is the riboside of 8-azahypoxanthine which is the product of the metabolism of 8-aza-adenine by the microorganism being used.

Use of end product

The end products are useful as ultra-violet ray absorbers. The uses of some products are, for example, 1. Purine riboside According to the report by R. Wolfenden, J. Kaufman & J. B. Macon in Biochemistry, 8, 2412–2415 (1969), purine riboside is a powerful inhibitor of adenosine deminase.

2. 2-Methylmercaptohypoxanthin riboside and 2-chlorohypoxanthine riboside

These two ribosides can be converted by a chemical process to guanosine and, therefore, can be used as intermediates for the production of 5'-guanylic acid which is used as a flavor enhancer.

Guanosine is also obtained from 2-methylmercaptohypoxanthin riboside when the riboside is treated with an oxidizing agent and thereafter allowed to react with ammonia.

2-Chlorohypoxanthine riboside produces guanosine when it is allowed to react with ammonia (J. Davoll, B. Lythgoe & A. R. Todd: J. Chem. Soc., 967, 1685 (1948).

3. 5-Fluorouracil riboside

This is known as an anti-cancer agent (USP 3650897).

4. 5-Bromouracil riboside

This product inhibits the reproduction of vaccinia virus (Galegov, G. A., Bikbulatov, R. M. Linitskaya, G. L. & Ivanorskii, D. I.: Progr. Antimicrob. Anticancer Chemother., Proc. Int. Congr. Chemother., 6th, 1969 (Pub. 1970), 2, 40–3).

5-Bromouridine (= 5-Bromouracil riboside) (7.5 × $10^{-4}$ M) was observed to repress the reproduction of variola virus in chick embryo fibroflast cultures according to Galegov, G. A., Bikbulatov, R. M. & Linitskaya, G. L.: Biokhimiya, 1970, 35 (3), 470 – 6. 5. 5-Iodouracil riboside This product acted as a better extracellular radiosensitizer than the 5-Br or 5-Cl derivatives and, in an acid solution, induced marked sensibility particularly to gamma irradiation (T. Kata, Y. Sadaie & T. Noguchi: Int. J. Radiat. Biol., 1970, 18 (3), 281–5).

6. 4-Thiouracil riboside

According to H. Ochiai & H. Shibata: Agr. Biol. Chem., 1970, 34 (11), 1751–3, this product retarded the photo-synthesis of chlorophill in cotyledons and inhibited the growth of chloroplast.

The present invention will be explained below with reference to preferred embodiments, which are solely illustrative of and not limitative in any way of the invention.

EXAMPLE 1

*Flavobacterium aquatile* (IFO 3772) was cultured for one day on a slant medium. One platinum loopfull of the seed culture was inoculated to a medium comprising 0.2% of $KH_2PO_4$ (%: wt/vol, all % are the same as this hereinafter), 0.05% of $MgSO_4.7H_2O$, 0.0005% of $MnSO_4.4H_2O$, 0.2% of $(NH_4)_2SO_4$, 7.5% of glucose, 1.0% casamino acid, 100 mcg/liter of thiamine-HCl, and 10 mcg/liter each of biotin, nicotinic acid amide, calcium pantothenate, para-aminobenzoic acid, riboflavin and pyridoxine-HCl (with the entire mixture adjusted to pH 7.0 with KOH) and then subjected to shaken culture at 30°C for 24 hours. After a culture medium possessing the same composition and additionally containing 4 mg/ml of 8-azahypoxanthin is added to the above pre-culture medium in the same volume respectively, the resultant culture solution was further subjected to shaken culture at 30°C for 48 hours. At the end of the culture, assay showed that 3.6 mg/ml of 8-azahypoxanthine riboside (8-azainosine) was accumulated in the culture solution. A 100-ml portion of the filtrate obtained after removal of the cells was concentrated under reduced pressure and adsorbed on active carbon. The eluate was concentrated under reduced pressure and then sent through a column packed with anion-exchange resin, Dowex I (Cl form). Then, elution was conducted by using a mixed solution containing 0.03 mol of KCl and 0.02 mol of $K_2B_4O_7$. The fraction of 8-azahypoxanthine riboside was collected, concentrated and adsorbed on and desorbed from active carbon. By adding alcohol to the desorption product, there was obtained 195 mg of crude crystals of 8-azahypoxanthine riboside.

EXAMPLE 2

By following the procedure of Example 1, the nucleic acid bases indicated in Table 1 were subjected to microorganic reaction. Consequently, corresponding nucleic acid base ribosides were observed to be formed in amounts shown in the same table.

Table 1

| Nucleic acid base as starting material | Concentration (mg/ml) | Produced riboside | Amount produced (mg/ml) |
| --- | --- | --- | --- |
| Purine | 0.5 | Purine riboside | 0.25 |
| 2-Chlorohypoxanthine | 2.0 | 2-Chrolohypoxanthine riboside | 3.3 |
| 2-Methylhypoxanthine | 2.0 | 2-Methylhypoxanthine riboside | 2.7 |
| 2-Methylmercaptohypoxanthine | 2.0 | 2-Methylmercaptohypoxanthine riboside | 2.8 |
| 2-Hydroxypurine | 1.0 | 2-Hydroxypurine riboside | 0.6 |
| 8-Azadenine | 1.0 | 8-Azahypoxanthine riboside | 1.6 |
| 8-Azaxanthine | 1.0 | 8-Azaxanthine riboside | 0.5 |
| 6-Azauracil | 1.0 | 6-Azauracil riboside | 1.7 |
| 2-Hydroxypyrimidine | 1.0 | 2-Hydroxypyrimidine riboside | 0.6 |
| 5-Hydroxyuracil | 1.0 | 5-Hydroxyuracil riboside | 0.9 |
| 5-Fluorouracil | 1.0 | 5-Fluorouracil riboside | 0.7 |
| 5-Chlorouracil | 1.0 | 5-Chlorouracil riboside | 0.5 |
| 5-Bromouracil | 0.5 | 5-Bromouracil riboside | 0.3 |
| 5-Iodouracil | 0.5 | 5-Iodouracil riboside | 0.2 |
| 5-Nitrouracil | 0.5 | 5-Nitrouracil riboside | 0.2 |

EXAMPLE 3

*Flavobacterium suaveolens* (ATCC 958) was cultured for one day on a slant medium. One platinum loopfull of the seed culture was inoculated to the same medium as used in Example 1 and subjected to shaken culture at 30°C for 24 hours. At the end of the shaken culture, the cells were collected. In a reaction solution comprising 5.0% of glucose, 0.02% of $MgSO_4.7H_2O$, 0.0005% of $MnSO_4.4H_2O$, 0.1% of $(NH_4)_2SO_4$, 0.1% of $NH_4Cl$, 1.0% of $K_2HPO_4$ and 1.0 mg/ml of respective nucleic acid base shown in Table 2, the cells were suspended in an amount to give a concentration twice as large as during the culture and then subjected to shaken reaction at 30°C for 40 hours. Consequently, corresponding nucleic acid base riboside were found to be formed in amounts indicated in the same table.

Table 2

| Nucleic acid base as raw material | Produced riboside | Amount produced (mg/ml) |
| --- | --- | --- |
| Purine | Purine riboside | 0.4 |
| 2-Chlorohypoxanthine | 2-Chlorohypoxanthine riboside | 1.4 |
| 2-Hydroxypurine | 2-Hydroxypurine riboside | 0.5 |
| 8-Aza-adenine | 8-Azahypoxanthine riboside | 1.5 |
| 8-Azahypoxanthine | 8-Azahypoxanthine riboside | 1.5 |
| 8-Azaxanthine | 8-Azaxanthine riboside | 0.4 |
| 6-Azauracil | 6-Azauracil riboside | 0.5 |
| 2-Hydroxypyrimidine | 2-Hydroxypyrimidine riboside | 0.5 |
| 5-Hydroxyuracil | 5-Hydroxyuracil riboside | 0.8 |
| 5-Fluorouracil | 5-Fluorouracil riboside | 0.6 |

EXAMPLE 4

Example 1 was repeated except that mutants cited below were used.

Mutants were obtained as follows.

Cells obtained by shaking culturing a wild strain at 30°C for 24 hours in the same medium as of Example 1 were washed twice with a buffer solution which is prepared by adding KOH to a 0.2 M aqueous $KH_2PO_4$ solution to control pH 7.0 and then adding a 0.002 M aqueous $MgSO_4$ solution.

Cells were then suspended in a solution which is prepared by adding 50 mcg/ml of N-methyl-N'-nitro-N-nitrosoguanidine to the above buffer solution, and shaken at 30°C for 60 min. The cells were washed twice with the buffer solution as above and shaking cultured in the same medium as above at 30°C for 6 hours. The cells were diluted to a proper concentration and then distributed and cultured at 30°C on a plate which has been prepared by adding 200 mcg/ml of 8-azaguanine to the medium as above and then adding thereto powder agar-agar. After from 2 to 8 days, colonies were picked up to obtain mutants. Various mutants can be obtained by changing compounds to be added to the agar-agar plate.

Table 4

| | | | Yield of riboside (mg/ml) from 1.0 mg/ml of 6-azauracil | Yield of riboside (mg/ml) from 1.0 mg/ml of 8-azahypoxanthine | Yield of riboside (mg/ml) from 1.0 mg/ml of 5-fluorouracil |
|---|---|---|---|---|---|
| *Flavobacterium suaveolens* | | | | | |
| ATCC 958 | Wild strain | | **0.5 | | |
| " | *8-AG$^r$-1 | (NRRL***B-5698) | 0.8 | | |
| " | 8-AG$^r$-2 | (NRRL B-5699) | 0.9 | | |
| *Flavobacterium aquatile* | | | | | |
| IFO 3772 | Wild strain | (NRRL B-5700) | **1.7 | 0.8 | 0.7 |
| " | 8-AG$^r$-1 | (NRRL B-5701) | 1.5 | 1.2 | 0.9 |
| " | 8-AG$^r$-2 | (NRRL B-5702) | 1.4 | 1.0 | 1.1 |
| " | 8-AG$^r$-3 | (NRRL B-5703) | 1.9 | 0.5 | 0.3 |

(Note)
*8-AG$^r$ = 8-azaguanine-resistant strain
**copied from Tables 1 or 2.
***deposited with contracts in free availability and maintenance, on Feb. 21, 1973.

What we claim is:

1. A process for the production of a riboside of a nucleic acid base derivative or an analog thereof selected from the group of compounds consisting of

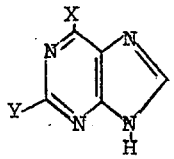

wherein X is a H atom or OH group and Y is H atom, alkyl group, alkylthio group, Cl atom or OH group, exclusive of when both X and Y are OH and when X is OH and Y is H;

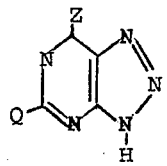

wherein Z is a OH or NH$_2$ group and Q is H atom or OH group;

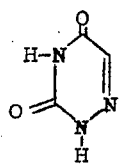 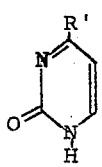

wherein R' is a H atom or SH group;

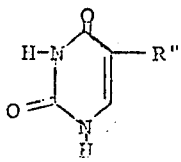

wherein R" is a OH group, F, Cl, Br or I atom or NO$_2$ group; or,

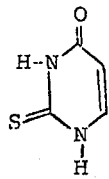

which comprises, culturing aerobically a microorganism which belongs to the genus Flavobacterium and possesses the ability to produce said riboside from said nucleic acid base derivative or an analog thereof for from one to four days at a temperature of from 20° to 35°C. in a medium containing carbon sources, nitrogen sources and inorganic salts capable of being utilized by the said microorganism, then either (1) allowing the thus produced Flavobacterium cells to remain in the medium in contact at a temperature of from 20° to 35°C for from one to four days with said nucleic acid base derivative or said analog thereof or (2) separating the thus produced Flavobacterium cells from said medium and contacting them with a solution containing said nucleic acid derivative or analog thereof, carbohydrate, magnesium ion and buffer at 20° to 35°C for one to four days, thereby producing said riboside and thereafter separating the accumulated riboside.

2. A process according to claim 1, wherein the microorganism of genus Flavobacterium is selected from the group consisting of *Flavobacterium aquatile* (IFO 3772), *Flavobacterium suaveolens* (ATCC 958) and mutants derived therefrom.

3. A process according to claim 1, wherein in (1) the nucleic acid base derivative or the analogue thereof is added at the beginning of the contact.

4. A process according to claim 1, wherein in (2) the nucleic acid base derivative or the analogue thereof is added to the culture medium after the contact has started.

5. A process according to claim 1, wherein the riboside is produced by (2) wherein the thus produced Flavobacterium cells are separated from the medium and are then brought into contact with said solution containing the nucleic acid base derivative or the analogue thereof.

6. A process according to claim 1, wherein the nucleic acid base derivative or analogue thereof is a compound selected from the group consisting of:
Purine,
2-Chlorohypoxanthine,
2-Methylmercaptohypoxanthine,
2-Hydroxypurine,
8-Aza-adenine,
8-Azahypoxanthine,
8-Azaxanthine,
6-Azauracil
2-Hydroxypyrimidine,
5-Hydroxyuracil,
5-Fluorouracil,
5-Chlorouracil,
5-Bromouracil,
5-Iodouracil,
5-Nitrouracil,
2-Thiouracil,
and 4-Thiouracil.

* * * * *

UNITED STATES PATENT AND TRADEMARK OFFICE
CERTIFICATE OF CORRECTION

PATENT NO. : 3,879,260
DATED : April 22, 1975
INVENTOR(S) : OSAMU KANAMITSU

It is certified that error appears in the above-identified patent and that said Letters Patent are hereby corrected as shown below:

Column 2, line 27: replace "invention" with

--- inventor ---.

Column 3, lines 35-40: 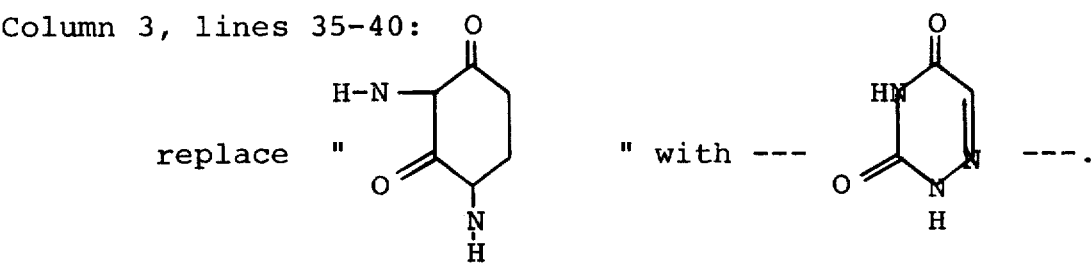

Column 3, line 44: replace "R" with --- R' ---.

Column 3, line 54: replace "R" with --- R" ---.

Column 5, line 50: replace "8aza-adenine" with

--- 8-aza-adenine ---.

UNITED STATES PATENT AND TRADEMARK OFFICE
CERTIFICATE OF CORRECTION

PATENT NO. : 3,879,260
DATED : April 22, 1975
INVENTOR(S) : OSAMU KANAMITSU

It is certified that error appears in the above-identified patent and that said Letters Patent are hereby corrected as shown below:

Column 3, lines 35-40:

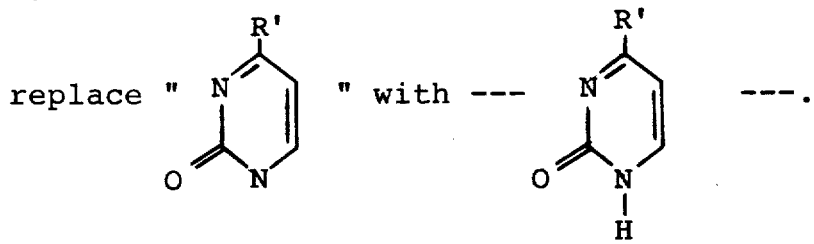

Column 3, lines 55-64:

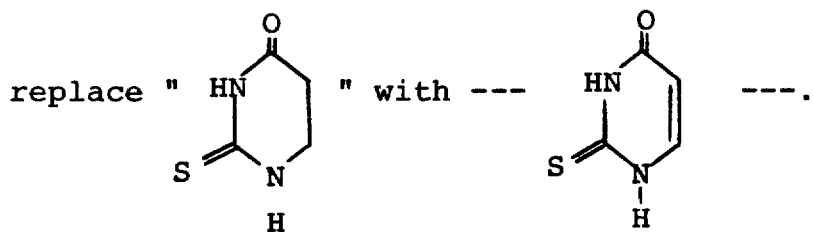

Signed and Sealed this eighth Day of June 1976

[SEAL]

Attest:

RUTH C. MASON
Attesting Officer

C. MARSHALL DANN
Commissioner of Patents and Trademarks